US009174128B2

(12) United States Patent
Guthridge et al.

(10) Patent No.: US 9,174,128 B2
(45) Date of Patent: Nov. 3, 2015

(54) DYNAMIC QUESTS IN GAME

(75) Inventors: Ian Guthridge, San Francisco, CA (US);
Edan Nahari, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 149 days.

(21) Appl. No.: 13/457,316

(22) Filed: Apr. 26, 2012

(65) Prior Publication Data

US 2013/0288757 A1  Oct. 31, 2013

(51) Int. Cl.
*A63F 9/24* (2006.01)
*A63F 13/00* (2014.01)
*A63F 13/30* (2014.01)
*A63F 13/69* (2014.01)
*A63F 13/60* (2014.01)

(52) U.S. Cl.
CPC .............. *A63F 13/12* (2013.01); *A63F 13/60* (2014.09); *A63F 13/69* (2014.09); *A63F 2300/556* (2013.01); *A63F 2300/6009* (2013.01); *A63F 2300/6018* (2013.01); *A63F 2300/807* (2013.01)

(58) Field of Classification Search
USPC ........................................................ 463/8
See application file for complete search history.

(56) References Cited

U.S. PATENT DOCUMENTS

| | | | | |
|---|---|---|---|---|
| 8,206,224 | B2* | 6/2012 | Farone et al. | 463/43 |
| 2005/0054404 | A1* | 3/2005 | Baerlocher | 463/9 |
| 2007/0087799 | A1* | 4/2007 | Van Luchene | 463/1 |
| 2007/0213112 | A1* | 9/2007 | Humphrey et al. | 463/12 |
| 2008/0064459 | A1* | 3/2008 | Kelly | 463/7 |
| 2009/0305774 | A1* | 12/2009 | Farone et al. | 463/25 |
| 2010/0099471 | A1* | 4/2010 | Feeney et al. | 463/1 |
| 2010/0105454 | A1* | 4/2010 | Weber et al. | 463/1 |
| 2010/0255914 | A1* | 10/2010 | Poh et al. | 463/37 |
| 2012/0231887 | A1* | 9/2012 | Lee et al. | 463/39 |

OTHER PUBLICATIONS

"Free web MMORPG Golemizer", source http://forums.golemizer.com/viewtopic.php?f=14&t=679 Accessed Mar. 26, 2009.*
"donjon; RPG Tools", source https://web.archive.org/web/20110114190347/http://donjon.bin.sh/ Accessed Jan. 14, 2011.*
"A Prototype Quest Generator Based on a Structural Analysis of Quests from Four MMORPGs", by Jonathan Doran and Ian Parberry, Mar. 2011.*
"The Quest in a Generated World", by Calvin Ashmore and Michael Nitsche, copyright 2007.*
"The Game Master", by Anders Tychsen et al. Copyright 2005.*

* cited by examiner

*Primary Examiner* — Steven J Hylinski
(74) *Attorney, Agent, or Firm* — Martine Penilla Group, LLP

(57) ABSTRACT

Methods, systems, and computer programs are presented for executing a game and for creating computer-generated game quests, which are referred to as dynamic quests. One method includes an operation for identifying a template for creating a dynamic quest. The dynamic quest includes quest tasks and quest rewards, which are provided to a player upon completion of the quest tasks in the game. The template includes template tasks and template rewards. Further, the method includes an operation for selecting one or more template tasks for the quest tasks, and an operation for selecting one or more template rewards for the quest rewards. The dynamic quest is created in the game with the selected one or more template tasks and the selected one or more template rewards.

19 Claims, 19 Drawing Sheets

DYNAMIC QUESTS IN GAME

BACKGROUND

1. Field of the Invention

The present embodiments relate to methods for executing games in a distributed environment, and more particularly, methods, systems, and computer programs for creating computer-generated quests in a game.

2. Description of the Related Art

Same games provide challenges to players, where the challenges entail the completion of one or more tasks within the game. As the player completes each challenge, the player receives rewards and new challenges are provided to continue the game. The challenges, sometimes referred to as quests, are typically created by development engineers that manually draft tens or hundreds, or maybe even thousands of different challenges for the players. A large number of available challenges in the game makes more difficult that players run out of challenges, which would cause players to leave the game because there is nothing else to do in the game. After a while, some experienced players may run out of challenges, causing these experienced players to leave the game.

Additionally, some players may dislike some of the challenges offered by the game, causing these players to ignore these disliked challenges and continue looking for new challenges that are more appealing. However, creating challenges is a time consuming task that requires human intervention.

In order to keep expert players engaged in the game, and to provide challenges to the liking of every player, a system is desired that would create a large amount of challenges at a minimum cost in order to keep players engaged in the game for longer periods of time.

It is in this context that embodiments arise.

SUMMARY

Embodiments of the disclosure provide methods, systems, and computer programs for executing a game and for creating computer-generated game quests, also referred to as dynamic quests.

It should be appreciated that the present embodiments can be implemented in numerous ways, such as a process, an apparatus, a system, a device, or a method on a computer readable medium. Several embodiments are described below.

In one embodiment, a method for executing an online game is provided, and the method includes an operation for identifying a template for creating a dynamic quest. The dynamic quest includes one or more quest tasks and one or more quest rewards, which are provided to a player upon completion of the one or more quest tasks in the online game. In addition, the template includes a plurality of template tasks and a plurality of template rewards. Further, the method includes an operation for selecting one or more template tasks for the quest tasks, and an operation for selecting one or more template rewards for the quest rewards. The dynamic quest is created in the online game with the selected one or more template tasks and the selected one or more template rewards, and the operations of the method are executed by a processor.

In another embodiment, a distributed game server includes a game engine module and a quest engine module. The game engine module provides online game capabilities to a plurality of users, and the quest engine module assigns quests to users of the online game. The quests include crafted quests, which are created manually, and dynamic quests, which are created by the quest engine module based on a template from a plurality of templates. Each dynamic quest includes one or more quest tasks and one or more quest rewards, which are provided to a player upon completion of the one or more quest tasks in the online game. In addition, each template from the plurality of templates includes a plurality of template tasks and a plurality of template rewards.

In yet another embodiment, a computer program, embedded in a non-transitory computer-readable storage medium, when executed by one or more processors, for executing an online game, is provided. The computer program comprises program instructions for identifying a template for generating a dynamic quest. The dynamic quest includes one or more quest tasks and one or more quest rewards, which are provided to a player upon completion of the one or more quest tasks in the online game. The template includes a plurality of template tasks and a plurality of template rewards. The computer program further includes program instructions for selecting one or more template tasks for the quest tasks, and program instructions for selecting one or more template rewards for the quest rewards. The dynamic quest is created in the online game with the selected one or more template tasks and the selected one or more template rewards.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, computer programs, systems, and apparatus for creating computer-generated quests in a game. Embodiments provide the ability to generate a large number of quests (e.g., 80,000 or more) without a person having to create each quest manually. The quests may be generated on demand on a server and then propagated to the clients, or may be buffered in advance of the player needing the assignment of a new quest.

It will be apparent, that the present embodiments may be practiced without some or all of these specific details. In other instances, well known process operations have not been described in detail in order not to unnecessarily obscure the present embodiments.

Figure 1:
FIG. 1 shows an interface for playing an online game within the frame of a social network, according to one embodiment.

FIG. 1 shows an interface for playing an online game within the frame of a social network, according to one embodiment. FIG. 1 illustrates a webpage 102 loaded on a social network website. In one embodiment, the online game is played within the webpage 102 of the social network in a game area 102, which is defined for playing the online game in the social website. In addition, webpage 102 may include other elements, such as advertisement area 104, game promotional area 106, etc.

The embodiment of FIG. 1 shows a screen capture for the game Pioneer Trail, formerly known as FrontierVille, provided by Zynga Inc., the assignee of the present application, but the principles presented herein may be applied to other online games, as well as to games that are not played online.

The Pioneer Trail is a simulation, role-playing video game available for play on social networking sites. The player plays the role of a pioneer of the American old west and utilizes an avatar which resembles a pioneer. The player may complete collections which may be traded for coins, experience points (XP), decorations, livestock, trees, craftable items, energy and horseshoes (rare money that can be bought with real money). The player may also finish goals which include tasks such as gathering money, buying energy, clearing land, chopping down trees, raising livestock and trees, creating items such as beds, furniture, and clobbering unwanted pests like bears, snakes, foxes and groundhogs. Eventually the player may acquire a spouse and have children.

Other tasks include collecting from buildings, building inns, wagons, general stores, cabins, schools, chicken coops, barns, trading posts, barber shops, churches, and sawmills as well as seeding, growing and harvesting crops. Coins enable the player to purchase decorations, buildings, crops, trees and animals. Horseshoes, which can be earned in-game or purchased through real-world cash or credit, allow the player to buy mules and horses, paint buckets, hand drills, nails, bricks, hammers, etc. These items are essential for completing certain goals. Friends may also "gift" some items to the player, which is referred to herein as a viral interaction.

Crops may be planted and must be harvested before they wither, and the crops with longer maturation times provide larger payoffs. Harvesting may trigger encounters with ground hogs, which must be "clobbered" to avoid using extra energy within their area of influence. Clobbering pests and harvesting crops yield coins, XP, and food. Food can be used to get energy, which is necessary to do many actions in the game. Energy can be purchased in exchange for food or horseshoes. When the player runs out of energy, the player must either purchase more energy with food or horseshoes, or wait for more energy to build up over time.

Animals may be purchased and harvested routinely for resources, or sold outright for a large one-time reward. The animals start out as juveniles and must be fed several times to grow into adults. Players can also plant fruit trees, such as cherry, apple, pear, peach, apricot, etc., and their fruits may be collected when the trees reach maturity.

Figure 2:
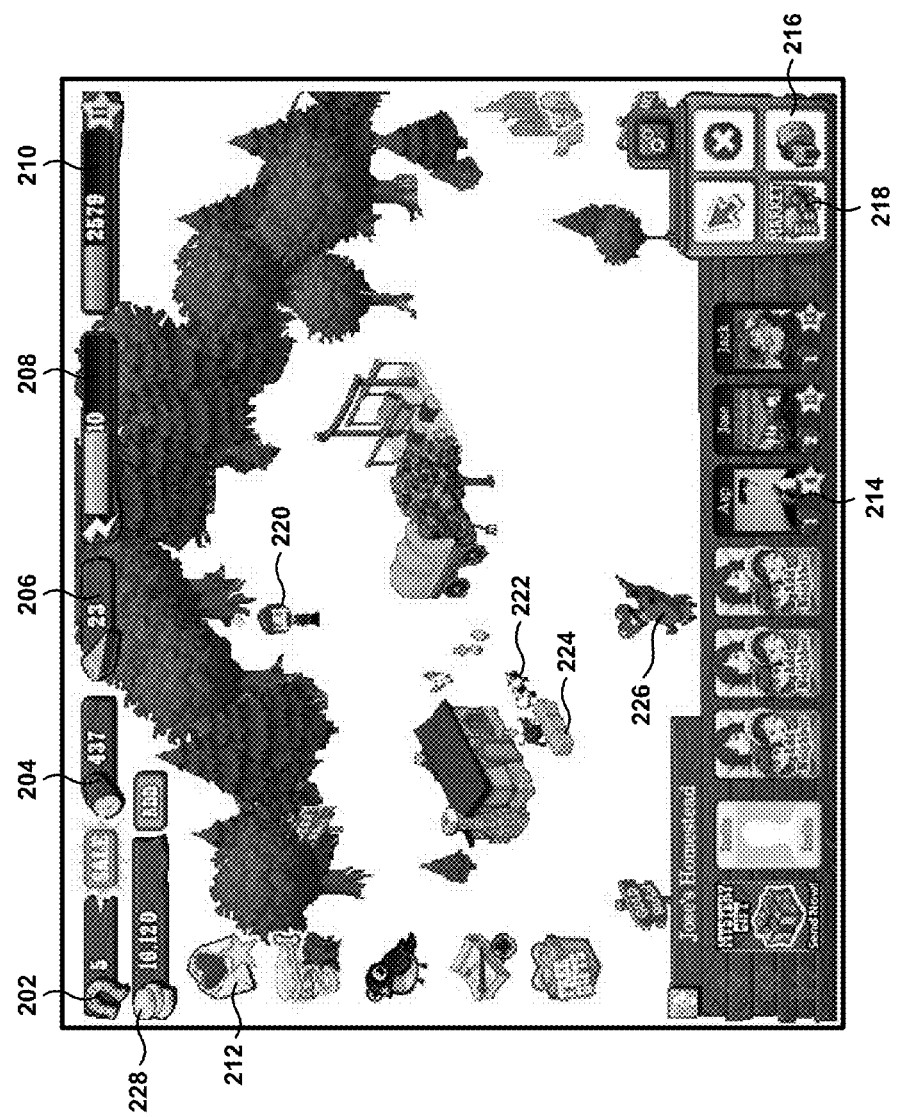
FIG. 2 shows the stage of an online game, according to one embodiment.

FIG. 2 shows the stage of an online game, according to one embodiment. The online game of FIG. 2 can be played in game area 102 of FIG. 1, but the online game can also be played in other environments. The game includes avatar 220, which can be manipulated by the player, such as by clicking the mouse around the play area. For example, if the mouse is clicked somewhere far away from the avatar, the avatar is moved to the faraway place, unless the mouse is clicked on some other game object that causes an in-game action (e.g., if the mouse is clicked on an animal, the avatar feeds the animal).

As the player advances in the game, the player acquires assets, which can take multiple forms. In one embodiment, assets include first virtual currency asset 202, second virtual currency 228, wood asset 204, food asset 206, energy asset 208, sheep asset 222, haystack asset 224, dancing bear asset 226, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 202 can be used during the game to make progress, also referred to herein as advancement. The first virtual currency 202 can be used to acquire assets (e.g., animals or crops), to remove an obstacle in the game (e.g., enabling progress that would otherwise be blocked), or to complete a task (e.g., finish decorating a house).

In particular embodiments, the first and the second virtual currencies are used for different purposes, although some assets may be bought with either of the currencies. The first virtual currency has a higher purchasing value than the second virtual currency. For example the first virtual currency can unblock some obstacles in the game that the second virtual currency cannot. Although a small amount of first virtual currency may be given to the player as the game starts, a player needs to purchase more first virtual currency with real currency, also referred to herein as legal currency, real-world currency, or real cash. This provides a revenue stream for the online game provider.

Some multiuser online games are styled after casino gambling games (e.g., poker, roulette, slot machines, etc.). In a gambling game, players generally obtain virtual currency for their character's use in the gambling game. In some gambling games and in other online games, players purchase virtual currency in exchange for legal currency, where the legal currency is transferred using a credit, debit, or charge card transaction conveyed over a financial network. In such games, the virtual currency may be represented by virtual poker chips or by a number or a value stored by the server for that player's benefit. A player interacts with the game server such that the player (or a character controlled by the player) plays a gambling game in hopes of increasing the amount of virtual currency.

In one embodiment, the online game includes quests 212, which may also be referred to as missions, goals, challenges, etc. The quests identify one or more tasks that the player must complete before the quest is considered satisfied or finished. For example, a request may require three tasks: chopping down a tree, feeding an animal, and planting an apple tree. Upon completion of the quest, the player is rewarded in some fashion, such as getting a new asset, increasing the amount of energy, getting more virtual currency, etc. As the player completes tasks and quests, the game score 210 is increased, and as the game score increases the experience level may also increase.

Clicking on inventory icon 216 causes the online game to display a list of all the items or assets owned by the player. In addition, clicking on marketplace icon 218 takes the player to a virtual marketplace where assets can be acquired. As described above, assets can be from within different categories such as crops, trees, animals, buildings, decorations, energy, special items, weapons, etc. Each category includes a plurality of assets within the category. For example, the animal category includes ducks, chickens, goats, sheep, pigs, etc. Some of the items within a category can be freely acquired by the player, while purchasing of some items can be blocked until certain game condition is met, such as reaching some score, finishing a quest, purchasing the ability to unblock the blocked item, etc.

In one embodiment, avatar 220 may be personalized by the player, i.e., the avatar is defined by a personal expression configured by the player. The personal expression may include type of skin, hair color, mouth, eyes, gender, age, clothing, etc. In one embodiment, the personal expression can be improved by acquiring personal-expression assets, such as fancy clothing (e.g., shoes, suits, hats). Acquisition of personal-expression items is made with virtual currency, in one embodiment.

In one embodiment, the online game is an online social game, which leverages social relationships between the player and other online game players socially linked to the player. For example, the player may add a neighbor to the game by inviting a friend from a social networking site. There are several online social networks run and maintained by various companies, and any one of these companies can provide access to social graph data. One such company, without limitation to others, may include Facebook. Once a friend accepts being a neighbor, a social relationship is established in the game where the game played by the player and the game played by the neighbor can interact with each other. For example, the player may visit the home of the neighbor and perform some game activities therein, and will be rewarded for doing so. Some of the quests in the game may include social activities that promote the interaction between players. For example, one quest may include planting tomatoes in the neighbor's farm. Therefore, the social interaction can provide advancement for the player and for the neighbor.

It is noted that the embodiments illustrated in FIG. 2 are exemplary. Other embodiments may utilize different assets, quests, social interactions, etc. The embodiments illustrated in FIG. 2 should therefore not be interpreted to be exclusive or limiting, but rather exemplary or illustrative.

Figure 3:
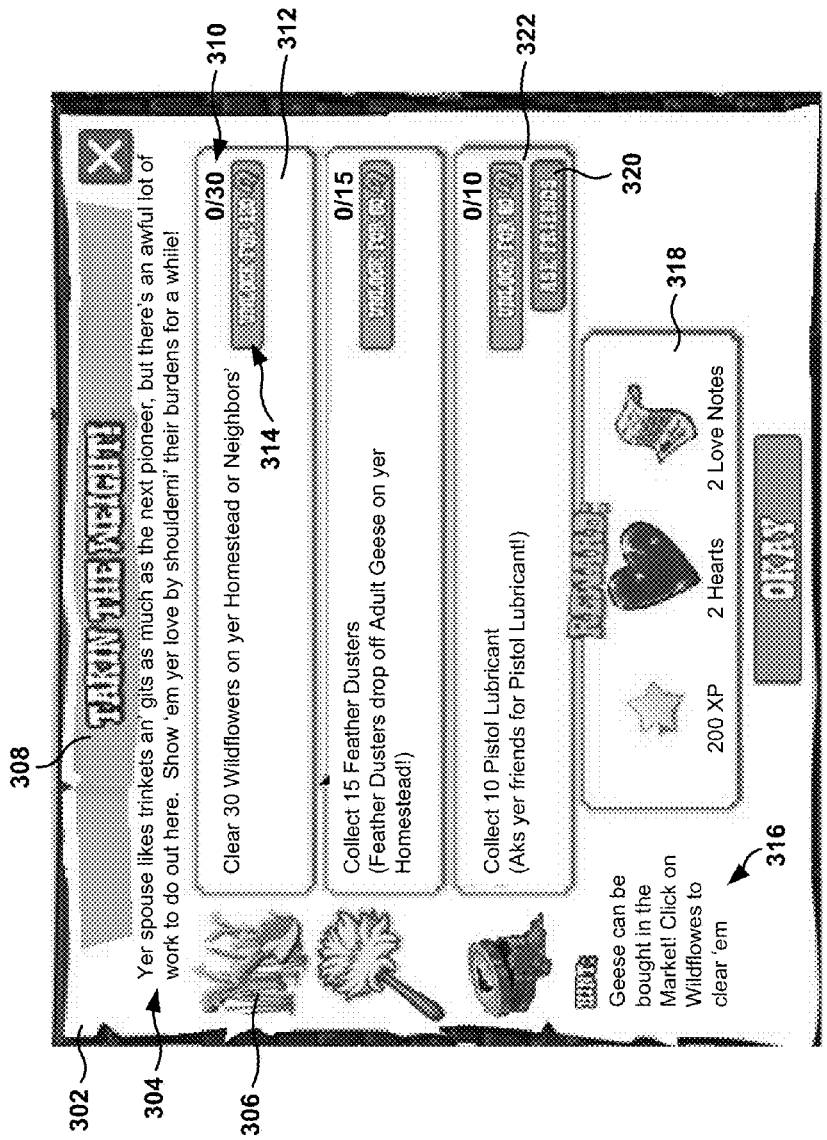
FIG. 3 illustrates a quest provided to a player in the game, according to one embodiment.

FIG. 3 illustrates a quest provided to a player in the game, according to one embodiment. FIG. 3 shows a quest whose design and logic have been created by a human designer (e.g., a design engineer or a product manager), i.e., the quest has been manually created by a person. Quests that are created manually are referred to herein as crafted quests, or manual quests, which are different from dynamic quests, which are those quests generated by a processor executing a computer program that generates the logic and features of the quests. In other words, a dynamic quest is a computer-generated quest.

The crafted quest 302 of FIG. 3 includes title 308 (e.g., "Takin The Weight!"), fiction 304, one or more tasks 312, one or more rewards 318, and a hint 316. It is noted that the embodiment illustrated in FIG. 3 is exemplary. Other embodiments may utilize additional elements, or may include fewer or more items than the ones included in FIG. 3. The embodiment illustrated in FIG. 3 should therefore not be interpreted to be exclusive or limiting, but rather exemplary or illustrative.

The fiction 304 is a sort textual description that provides background information regarding the quest to be performed. For example, the section 304 may describe a problem with the player's avatar, or with some other character in the game, which requires the player to perform some tasks in order to solve this problem.

Each task 312 includes an action that must be performed by the user in the game. In one embodiment, some tasks are related to an object, and completion of the tasks requires performing an action on the object. For example, one object may be a cow, and a related task may be "tending the cow." Other tasks do not require performing an action on an object, such as for example "visiting a neighbor."

The action may have to be done once or may have to be repeated multiple times in order to complete the task in the quest. A counter 310 indicates how many times the player has performed the action, and the total number of times required to complete this task (e.g., 5/30 means that the player has performed the action, such as clearing wildflowers, 5 times out of 30). Further, the task includes an unlock option 314 to complete (e.g., unlock) the task by spending game currency (e.g., gold horseshoes). In one embodiment, an icon 306 is associated with the task and provides a graphical representation related to the task.

Some tasks may be viral tasks, which require the cooperation from another player. In one embodiment, a button 320 provides the player the option to open a dialogue to originate a request for one or more friends to help with the viral task.

A quest may include one or more non-viral tasks and one or more viral tasks. It is noted that the embodiment illustrated in FIG. 3 is exemplary. Other embodiments may utilize a different number of tasks and different types of tasks. For example, in one embodiment, the quest includes one non-viral task and one viral task, but other combinations are also possible. One quest may include non-viral tasks exclusively and another quest may include viral tasks exclusively. The embodiments illustrated in FIG. 3 should therefore not be interpreted to be exclusive or limiting, but rather exemplary or illustrative.

In one embodiment, the quest includes a hint 316 that gives the player a clue on how to complete one or more of the tasks. Further, the quest includes one or more rewards, which the player gains when the quest is completed, e.g., all the tasks are completed. The reward may include a new asset for the player or an increase in one or more of the assets currently owned by the player. For example, the reward may include adding virtual currency, adding energy to play the game, getting a new cow, obtaining an item for a collection in the game, etc.

Figure 4:
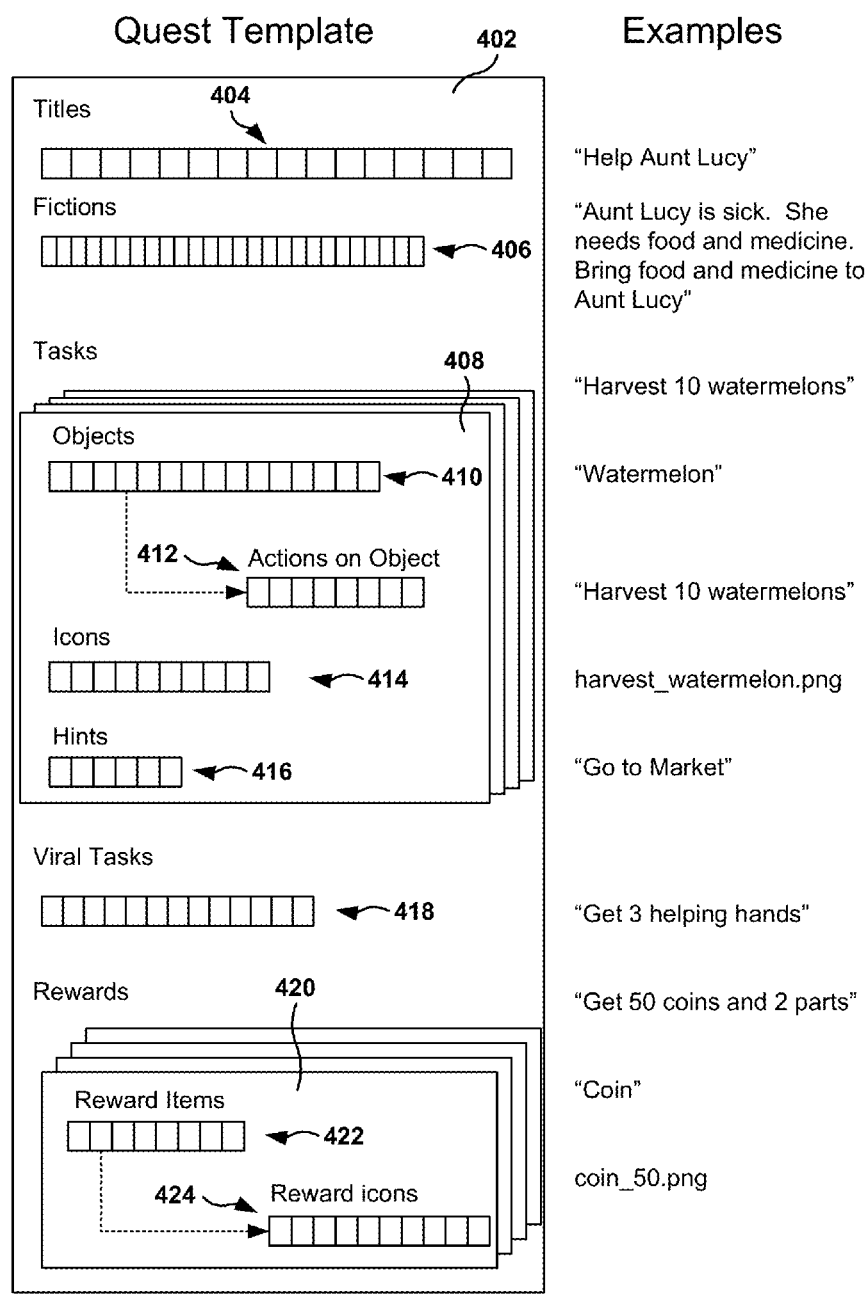
FIG. 4 depicts the structure of a template for generating dynamic quests, in accordance with one embodiment.

FIG. 4 depicts the structure of a template for generating dynamic quests, in accordance with one embodiment. Embodiments of the specification create dynamic quests, which are quests that are generated by a processor executing a computer program without direct human intervention. In one embodiment, the dynamic quests are created when the user requests a new quest, and in another embodiment, the dynamic quests are created in advance and placed in a buffer of quests where the quests are stored until the quests are needed.

Advanced players may complete all the game-crafted quests and run out of things to do. With dynamic quest generation, advanced players do not run out of quests to perform because the system generates new quests as needed.

The quest generation system utilizes a plurality of quest templates, which can be customized to generate thousands (or millions) of different quests. Each template offers a plurality of different elements, and a few of those elements are selected to generate a quest. During dynamic quest generation, the quest generation system selects one or more of the tasks in the template to create the dynamic quest.

In one embodiment, a template 402 to generate dynamic quests includes: a plurality of titles 404, a plurality of fictions 406, a plurality of tasks 408, a plurality of viral tasks 418, and a plurality of rewards 420. Each title 404 provides a textual description for the dynamic quest, and one of the titles from the template (e.g., "Help Aunt Lucy") is selected for the new dynamic quest.

The fiction 406 provides a textual description that is added to the dynamic quest (e.g., "Aunt Lucy is sick. She needs food and medicine. Bring food and medicine to Aunt Lucy"), and is presented to the user when the dynamic quest is given. More details on an example of a dynamic quest are provided below with reference to FIG. 5. In one embodiment, the fictions 406 and the titles 404 are generic so any title and any fiction may be combined with any task and any reward. In another embodiment, certain fictions may only be used with certain titles, and some titles may only be used with a predetermined set of the possible fictions.

In one embodiment, each task 408 includes a plurality of objects 410, a plurality of icons 414, and a plurality of hints 416. The object 410 (e.g., "watermelon") refers to an item in the game that is associated with the task to be performed. For each object 410, there are one or more possible actions 412 (e.g., "Harvest 10 watermelons") that may be performed on the object. In one embodiment, the icons 414 are not associated with the object, and in another embodiment the icons 414 are related to the object. For example, a figure of a watermelon may be an icon for the watermelon object. In addition, in another embodiment, hints 416 (e.g., "Go to market to purchase watermelon seeds") are provided to guide the user towards the completion of the task. The hint may be related to the object or may be a generic hint.

Viral tasks 418 include tasks that require a social interaction with a friend playing the game. In one embodiment, a viral task may also be associated with an object. For example, a viral task may be "ask friends for wood boards," where the wood boards are objects associated with the viral task. In another embodiment, the viral task 418 is not associated with an object (e.g., "Get 3 helping hands").

In one embodiment, the rewards 420 include a plurality of reward items 422, and each reward item 422 (e.g., a coin) has an associated reward icon 424 (e.g., image of a coin or coins symbolizing currency).

In one embodiment, each template is associated with a theme, and the tasks generated with the template relate to the underlying template theme. In one embodiment, the theme is selected from a group consisting of animals, cooking, farming, building, gambling, games of chance, puzzles, fighting, battles, strategy, fantasy, cops and robbers, or cleaning, but other themes are also possible.

It is noted that the embodiment illustrated in FIG. 4 is exemplary. Other embodiments may utilize different fields, additional fields, fewer fields, or the same fields arranged in a different fashion. The embodiment illustrated in FIG. 4 should therefore not be interpreted to be exclusive or limiting, but rather exemplary or illustrative.

Figure 5:
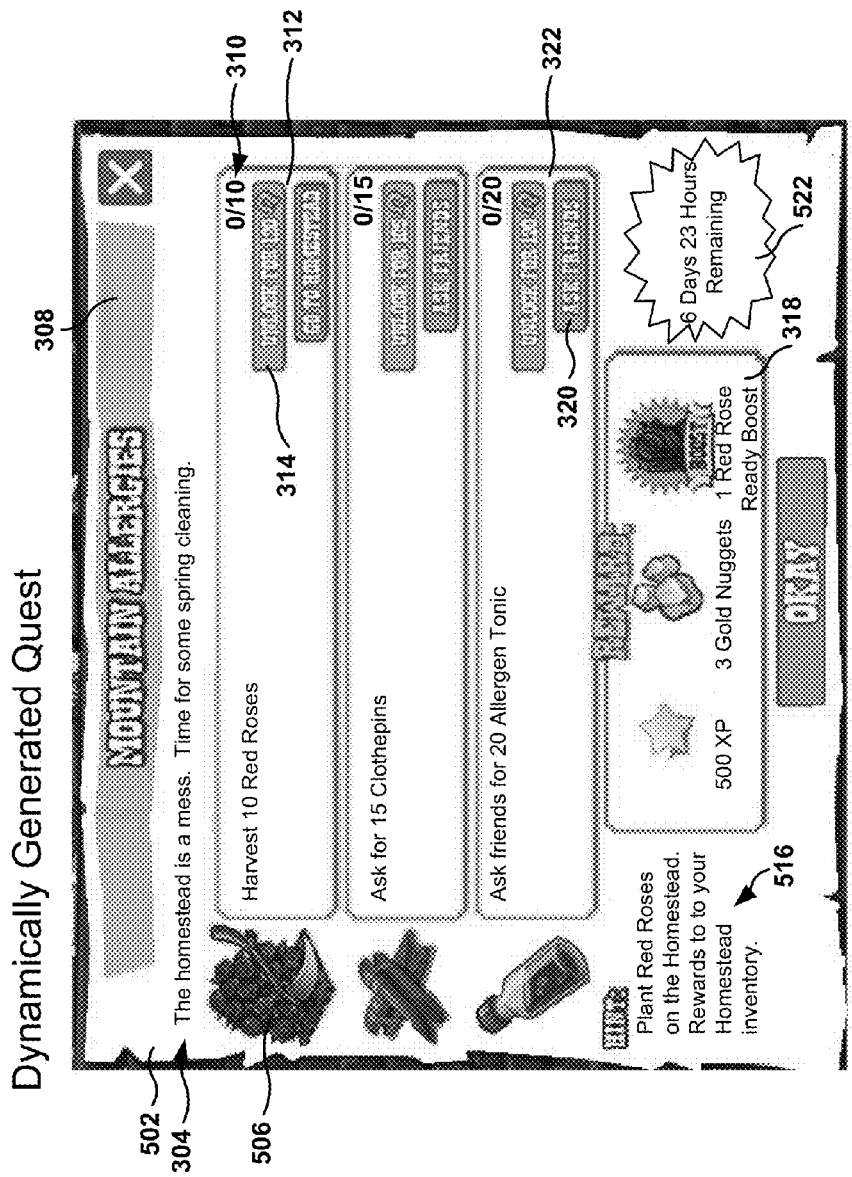
FIG. 5 illustrates a dynamically generated quest, according to one embodiment.

FIG. 5 illustrates a dynamically generated quest 502, according to one embodiment. In one embodiment, the player of the game is not aware whether a certain task is a crafted task or is a dynamic task, because the two types appear similar to the user. The dynamic quest 502 of FIG. 5 is similar to the crafted quest 302 of FIG. 3 and contains similar elements. In another embodiment, an indicator is presented to the player letting the player know whether the quest is crafted (e.g., was created during the development of the game) or the quest has been dynamically generated by the system. The crafted quests and dynamic quests may have a different appearance.

The dynamic quest 502 includes title 308; fiction 304; a plurality of tasks 312 and 322; rewards 318 and 516; and timer 522 indicating how much time is left for finishing the quest. In one embodiment, one icon 506 is presented for each of the tasks. Some quests have a timer or deadline for finishing the quest and the player is given a fixed amount of time to finish all the tasks in the quest.

In one embodiment, the player has the ability to abandon a quest if the player does not desire to complete the quest. A new quest may then be generated for the player. To avoid having a player abandoning too many quests, the player gets charged with some penalty after abandoning a predetermined number of quests. In one embodiment, the penalty gets bigger as the number of abandoned quests grows. In one embodiment, the counter of abandoned quests may be reset or decreased after the player completes one or several quests. The penalty may be the loss of some game currency or some other game asset. In another embodiment, a player that abandons a predetermined amount of quests gets charged a penalty for getting new quests.

Dynamic quests may be utilized not only with experienced users, but also with beginner and intermediate users, because quests may be dynamically generated at any time during the game. If the game does not have many crafted quests, the use of dynamic quests enable players to stay interested in the game and play for a longer period of time.

Figure 6:
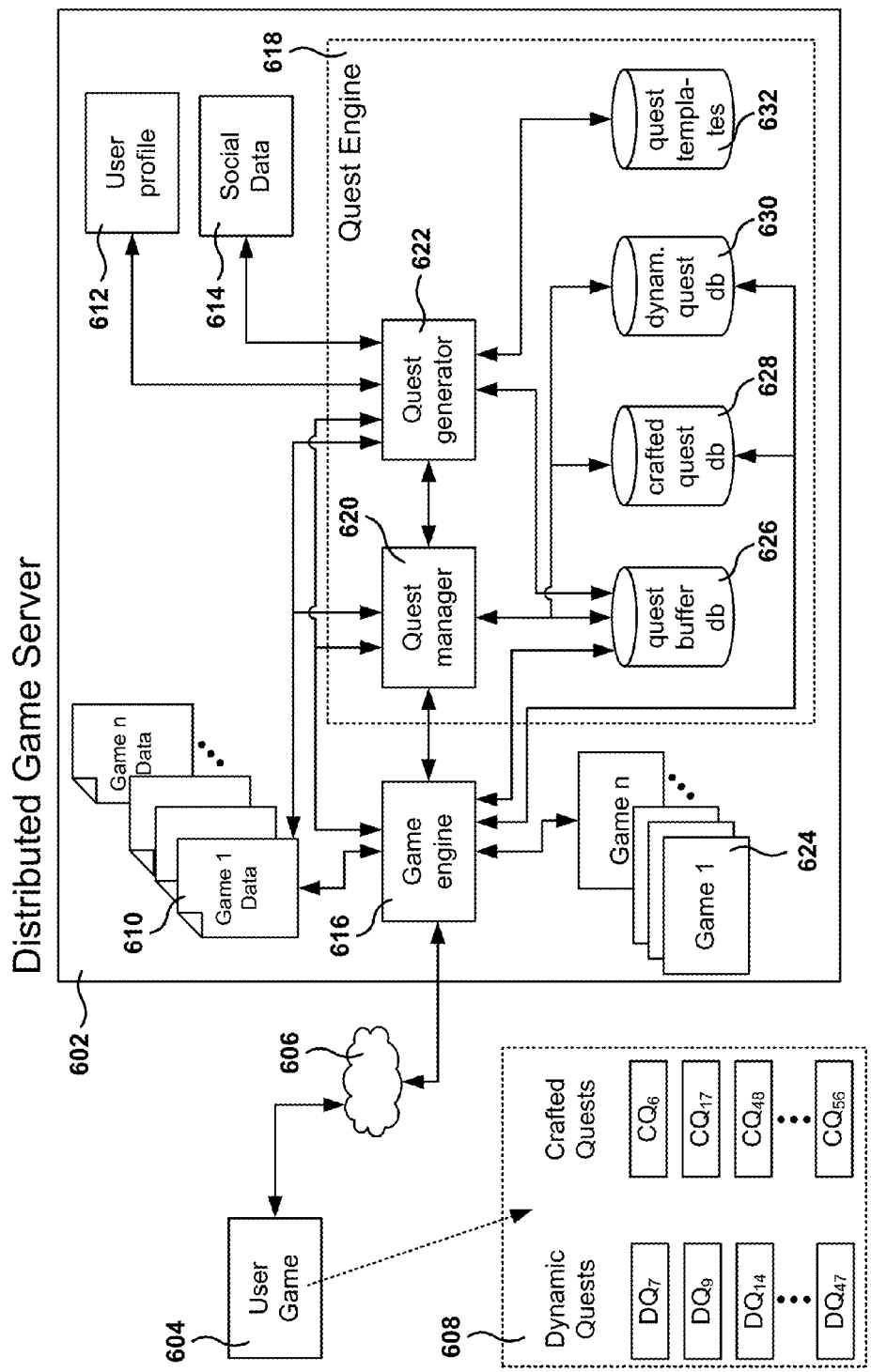
FIG. 6 is a simplified schematic diagram of a system for implementing embodiments described herein.

FIG. 6 is a simplified schematic diagram of a system for implementing embodiments described herein. In one embodiment, a distributed game server 602 provides game services to online users. The users play the game 604 on a computing device to access to the distributed game server services via network 606. In one embodiment, the game is played on a browser, but other types of computing platforms may also be utilized.

The user game 604 may include dynamic quests (DQ) (e.g., $DQ_7$, $DQ_9$, $DQ_{14}$, and DQ47) or crafted quests (CQ) (e.g., $CQ_6$, $CQ_{17}$, $CQ_{48}$, and CQ56). The distributed game server 602 includes a game engine 616 and a quest engine 618. The game engine 616 provides the computing resources required to play one or more online games 624 by a plurality of users. The game engine is also referred to as the game server, and more details are provided below with reference to FIGS. 9 and 10.

Game data 610 for the players is kept in a database and is accessible by, at least, the game engine and the quest engine 618. The game data includes a profile of the user, experience level, inventory of assets, dynamic quests pending, crafted quests pending, etc.

The quest engine 618 manages the operation of game quests, including the creation, monitoring, deletion, expiration, and buffering of quests. The quest engine 618 includes a quest manager 620, a quest generator 622, and several databases containing quest data. The quest manager 620 manages the quest system and interfaces with the game engine 616, the quest generator 622, and quest databases. In addition, the quest manager 620 access different types of game-related information, such as game data 610, and game status 624.

The game engine 616 sends quest related requests to the request manager and may also access the quest data directly from the quest databases. The quest manager 620 performs the quest related operations requested by the game engine 616 and returns the appropriate data or status information to the game engine.

It is undesirable that the player waits a long time to obtain new dynamic quests after the previous quest is completed. In one embodiment, a buffer defined to hold 3 or more quests is kept for each player. The quest databases include a quest buffer database 626, a crafted quest database 628, a dynamic quest database 630, and a quest template database 632. The quest buffer database 626 includes dynamically generated quests which are readily available in case a user requests a new quest. In one embodiment, the buffered quests are placed in the database indexed by user, which means that the system generates quests with each user in mind, taking into account the game status, the profile information of the user, and the game history of the user. In one embodiment, 3 quests are buffered per user, but other number of buffered quests is also possible. Further, the system may create a different number of buffered quests according to the level of the user, or the past history of the user. For example, the system may offer a larger number of quests for a very active user, while offering fewer quests, if any, for players with low activity or with a beginner status.

In another embodiment, the system creates a pool of quests that are made available to whichever user requests a new quest. This way, it is easier to guarantee that quests are available for any requesting user. Of course, the system may utilize a quest delivery algorithm to filter the buffered quests in order to assign quests that are not repetitive, too difficult, or too easy to the same user. For example, the system may select one quest from the buffer and see if the selected quest matches a quest assignment criteria before delivering the quest to the player. If the criteria is met, the quest is delivered. Otherwise, the process is repeated with other quests extracted from the buffer until a quest meets the quest assignment criteria.

The crafted quest database 628 includes crafted quests that have been created by game developers, such as for example some quests created before the game is made available to players. Of course, other additional crafted quests may be added to the crafted quest database 628 over time.

The dynamic quest database 630 contains, as its name indicates, dynamic quests generated by the system. In one embodiment, dynamic quests are added to the system over time. The dynamic quests can be transferred from the quest buffer database or may be created by the quest generator and added to the dynamic quest database 630. In one embodiment, the dynamic quests are deleted from the database a predefined amount of time after completion (e.g., a week, six months, a year, etc.), and in another embodiment the completed dynamic quests are kept in the database.

The quest template database 632 holds the quest templates utilized to generate dynamic quests. When the quest generator 622 receives a request to provide a new dynamic quest, the quest generator generates a new quest and places the new quest in the quest buffer database or in the dynamic quest database. The quest generator utilizes game history and other game related information, such as user profile 612, user social data 614, etc., to generate the quests. More details are provided below with reference to FIGS. 8A-8D regarding the methods for generating dynamic quests.

In addition, the quest generator 622 periodically checks the quest buffer database 626 and creates new dynamic quests to add to the quest buffer database, as needed. In one embodiment, the quest buffer database includes three dynamic quests per user, and the quest generator 622 adds new dynamic quests to the quest buffer database so each user has three buffered dynamic quests.

In one embodiment, when a problem is detected with the generation of dynamic quests (e.g., a template used to generate quests has been found defective) the quest generator 622 performs a cleanup operation of the quest buffer database 626 by deleting the suspect dynamic quests from the buffer. After the suspect dynamic quests are eliminated, the quest generator 622 proceeds to generate new dynamic quests in order to fill the buffer.

One of the advantages of generating dynamic quests in the distributed game server 602 is that a malicious player does not have the opportunity to perform malicious operations on the quest generating system, which may be the case if the quests were generated at the client. For example, a malicious user may be able to generate easy quests that would produce a large amount of undeserved rewards. By generating the dynamic quests in the game server platform, the opportunity for malicious users to generate improper dynamic quests is eliminated or greatly reduced.

In one embodiment, the quest generator 622 utilizes a caching mechanism to recycle dynamic quests in order to assign the same dynamic quests to multiple users. This reduces the amount of CPU required by the quest generator 622 because the number of generated dynamic quests is reduced due to the reuse of some, or all, of the dynamic quests. In this embodiment, a pool of dynamic quest is generated and then when the player requests a new quest, the new dynamic quest is taken from the pool of dynamic quests. Of course, the system keeps track of the quests already served to a particular user in order to avoid repetition.

It is noted that the embodiments illustrated in FIG. 6 are exemplary. Other embodiments may utilize different elements, or the functionality of one or more elements may be combined or distributed over a different number of components. The embodiments illustrated in FIG. 6 should therefore not be interpreted to be exclusive or limiting, but rather exemplary or illustrative.

Figure 7A:
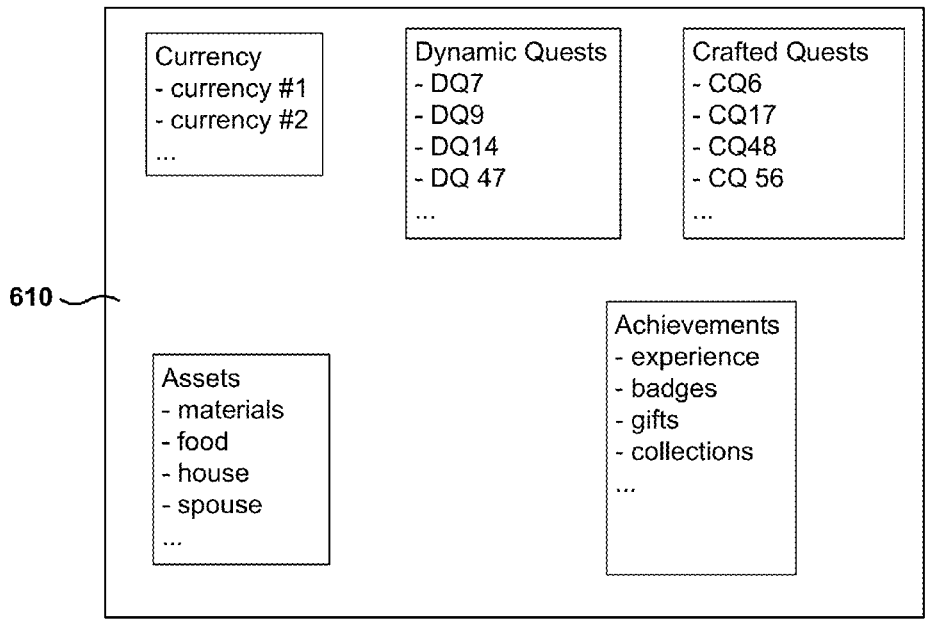
FIG. 7A illustrates a sample data structure to store player game data, according to one embodiment.

FIG. 7A illustrates a sample data structure to store player game data, according to one embodiment. In one embodiment, game data 610 for a player includes currency data, dynamic quest data, crafted quest data, asset data, and achievement data. The currency data includes an amount of virtual currency held by the player for one or more types of virtual currency (e.g., currency #1, currency #2, etc.) utilized in the game. Dynamic quest data includes a list of the dynamic quests that have been completed or that are in progress (e.g., DQ 7, DQ 9, etc.).

In one embodiment, the crafted quest data includes a list of crafted quests (e.g., CQ6, CQ17, etc.) that have been completed or that are in progress. The asset data includes the items owned by the player in the game, such as building materials, food, housing, spouse or other non-player characters, etc. The achievement data includes a list of accomplishments in the game, such as experience level, badges earned, gifts received, collections completed or in progress, etc.

Figure 7B:
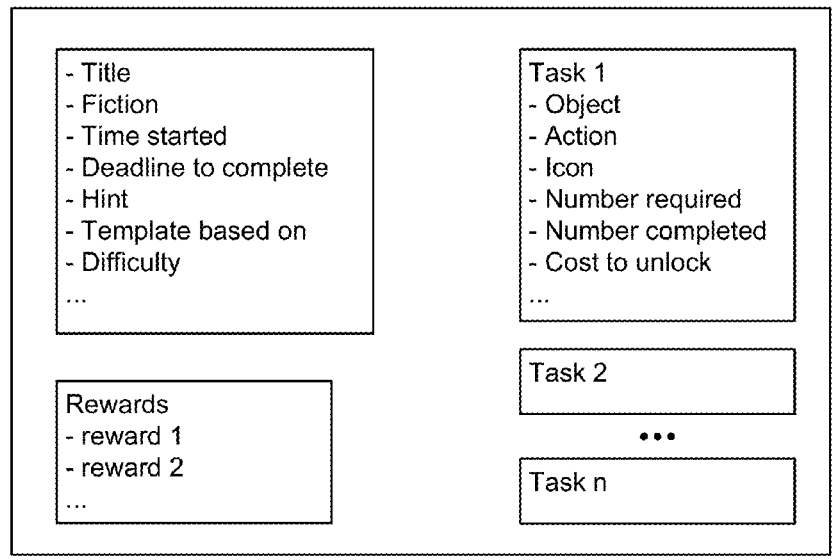
FIG. 7B illustrates a sample data structure to hold dynamic quest data, according to one embodiment.

FIG. 7B illustrates a sample data structure to hold dynamic quest data, according to one embodiment. Some players do not like to do certain tasks. One of the advantages of dynamic generation of quests is that dynamic quests give the player the option of performing quests that include tasks that the player likes to perform (e.g., viral requests).

In one embodiment, the player is able to perform the crafted quests and the dynamic quests simultaneously, that is, the user may alternate performing tasks of dynamic quests with task from crafted quests. For example, in some games were the player has a Homestead, the same Homestead is utilized for performing dynamic and crafted quests.

Further, it is not desirable to have to fetch data from the templates when the user is playing the game. Therefore, in one embodiment, all the data required for performing the dynamic quest is kept in the dynamic quest data structure.

In one embodiment, the dynamic quest includes the title, one or more fictions, the starting time, the completion deadline (if any), one or more hints, the template utilized to generate the dynamic quest, the difficulty level, one or more rewards, one or more tasks, etc. In one embodiment, each task is associated with an object, an action associated with that object, an icon, the number of times the task has to be repeated for completion of the requirement in the dynamic quest, the number of times that the task has been completed (e.g., 3 out of 20), the cost in virtual currency required to unlock the task (e.g., how much would cost the player to unlock this task and consider it complete without having to actually perform the task), etc. In addition, some of the tasks may be viral tasks, and may include viral information (not shown) such as date of the viral request, friends that received the viral request, etc.

It is noted that the embodiment illustrated in FIG. 7B is exemplary. Other embodiments may utilize different fields, or arrange the fields in different fashion. The embodiment illustrated in FIG. 7B should therefore not be interpreted to be exclusive or limiting, but rather exemplary or illustrative.

In one embodiment, the data structure for holding a dynamic quest is defined in programming language as follows:

```
[HarvestCrops_0] => Array
  ([name] => HarvestCrops_0
   [startTime] => 1327546140
   [expireTime] => 1328755740
   [config] => Array
     ([fiction] => HarvestCrops_Fiction_2
      [tasks] => Array
        ([0] => Array
          ([trigger] => performActionOnObject
           [text] => HarvestCrops_task
           [type] =>
           [data] => Array
             ([objects] => Array
               ([item] => Array
                 ([watermelon] => Array
                   ([name] => watermelon ) ) )
              [actions] => Array
                ([action] => Array
                  ([harvest] => Array
                    ([name] => harvest)
                   [harvestcrop] => Array
                    ([name] => harvestcrop ) ) )
              [states] => Array ( ) )
           [icon] => assets/quests/qd_harvest_watermelon.png
           [hint] => quest_hint_market
           [unlockable] => 90
           [total] => 18 )
         [1] => Array
           ([trigger] => checkCollectedResource
            [type] =>
            [data] => Array
              ([resources] => Array
                ([resource] => Array
                  ([dqs_teamwork] => Array
                    ([name] => dqs_teamwork))))
            [total] => 12
            [feed_name] => dqs_teamwork
            [icon] => assets/crafting/dqs_teamwork.png
            [unlockable] => 84
            [text] => dqs_teamwork_task
            [hint] => dqs_teamwork_hint ))
      [npc] => doc
      [reward] => Array
        ([dqs_teamwork] => -12
         [xp] => 900
         [gold] => 900
```

```
         [saloon_green_lightning] => 2 )
      [rewardIcons] => Array
        ([xp] => assets/doobers/xp.png
         [gold] => assets/doobers/coin_50.png
         [saloon_green_lightning] => assets/saloon_light.png))
    [progress] => Array
      ([0] => 0
       [1] => 2 )
    [statID] => 1002035003002050
    [purchased] => Array
      ([0] => 0
       [1] => 0 ))
```

Figure 8A:
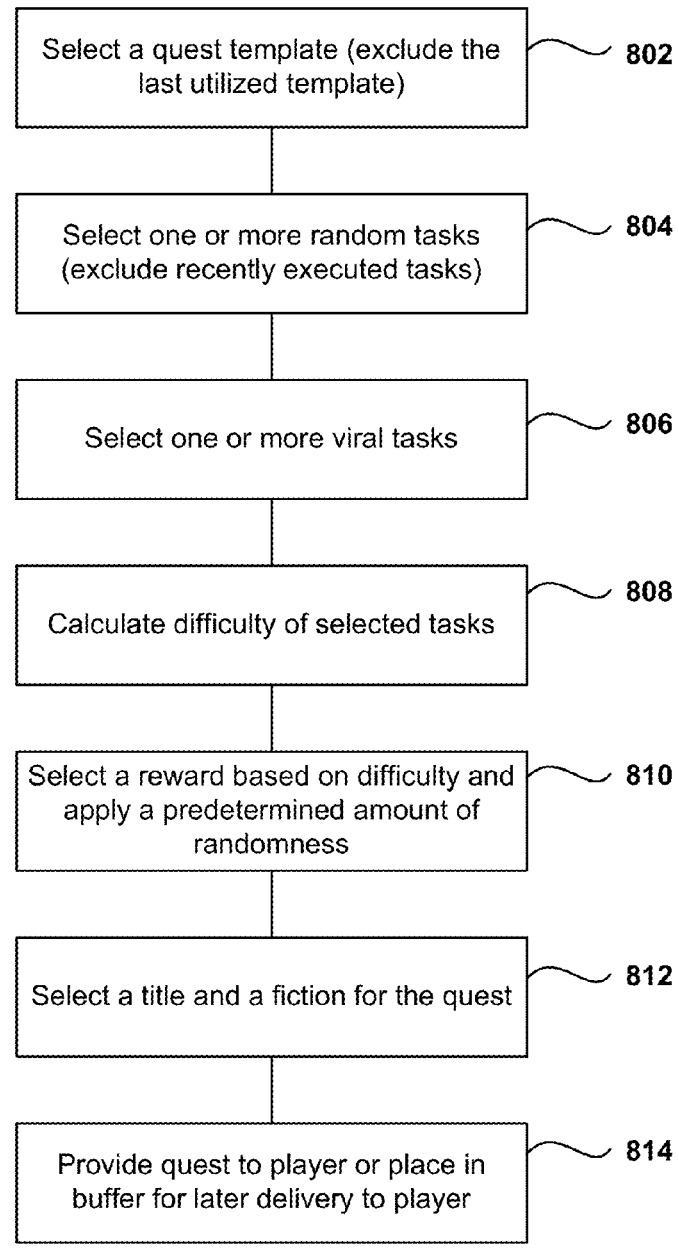
FIG. 8A shows the flow of a process for generating a quest, according to one embodiment.

FIG. 8A shows the flow of a process for generating a quest, according to one embodiment. When a player requests a new dynamic quest, the request is sent to the quest engine at the distributed game server. In operation 802, a quest template is selected at random for generating the dynamic quest. In another embodiment, an algorithm containing template selection rules is utilized to select the template. The rules to select the template may be based on player characteristics, player social data, experience level, number of quests completed, number of quests abandoned, player-preferred themes, etc. The system keeps track of the templates and tasks utilized for this user, in order to avoid repetition. In one embodiment, the same template is not used twice in a row for the same player.

From operation 802, the method continues to operation 804 where one or more tasks are selected for inclusion in the new dynamic quest. In one embodiment, the tasks are selected at random, but other criteria may also be possible. In another embodiment, a random generated quest is checked to determine if the task has been utilized recently to generate another dynamic quest for this player. If the task has been recently used, the task is discarded and a new random task is generated. The process is repeated until the dynamic quest is completed with all the necessary tasks.

In one embodiment, the quest manager checks whether the player has the ability to perform the selected tasks. If the player does not have the ability to perform these selected tasks (e.g., the player does not have the ability to get an item to complete the task or does not have the required experience level), the task is discarded and a new task is selected for the dynamic quest.

In one embodiment, the quest generator checks that the new tasks have not been utilized for a predetermined number of most recent dynamic quests. For example, the quest manager checks that a new task is not one of the last three tasks assigned to the player, although a different number of tasks may be utilized in order to provide a different degree of variety.

From operation 804, the method continues to operation 806 where one or more viral tasks are generated from the template. As in the case of non-viral tasks, the system also checks that the generated viral task has not been assigned to the player recently, in order to provide variety in the game.

Further, in operation 808, the difficulty of the selected tasks (i.e., the difficulty of the dynamic quest) is calculated in order to generate an appropriate reward, which is appropriate for the difficulty of the dynamic quest. In one embodiment, the difficulty of each task is calculated based on the cost, in virtual currency, to "unlock" the task without having to actually perform the task. For example, if a task requires 4 horseshoes to unlock, the difficulty will be based on the 4 horseshoes.

In another embodiment, the system tracks the completion rates of the assigned tasks, as well as the abandonment rate for those tasks. The difficulty of each of the tasks is then calculated based on performance parameters, such as completion rate, timing required to completion, abandonment rate, order in which tasks are completed within the quest, cost to "unlock" the task, etc.

From operation 808, the method continues to operation 810 where the reward is selected based on the difficulty of the selected tasks. In addition, the reward includes a certain degree of randomness to provide interest in the game, so the player sometimes get larger rewards, although sometimes the player may get smaller rewards.

After selecting the reward, the method flows to operation 812 where title and fiction are selected for the quest. In one embodiment, the title and the fiction are selected at random. From operation 812, the method continues to operation 814 where the quest is either given to the player or placed in a buffer for later delivery when the player requests a new dynamic task.

Figure 8B:
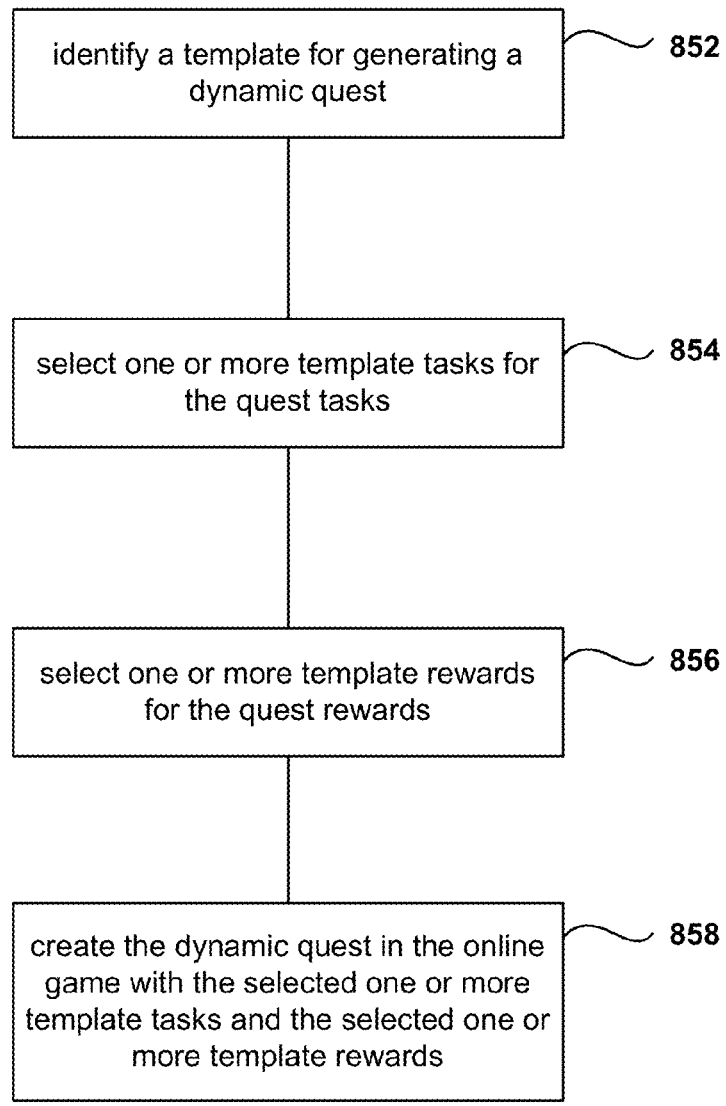
FIG. 8B shows a flowchart illustrating an algorithm for creating dynamic quests in accordance with one embodiment.

FIG. 8B shows a flowchart illustrating an algorithm for creating dynamic quests in accordance with one embodiment. In operation 852, a template for generating a dynamic quest is identified (e.g., a template from template database 632 of FIG. 6).

From operation 852, the method flows to operation 854 where one or more template tasks are selected for inclusion in the new dynamic quest being created (e.g., one of the tasks 408 in quest template 402 of FIG. 4). After selecting the tasks, one or more template rewards are selected in operation 856. The selected template rewards are included in the generated dynamic quest.

From operation 856, the method flows to operation 858, where the dynamic quest is created in the online game. The created dynamic quests includes the selected one or more template tasks and the selected one or more template rewards. In one embodiment, the operations of the method are executed by a processor.

Figure 8C:
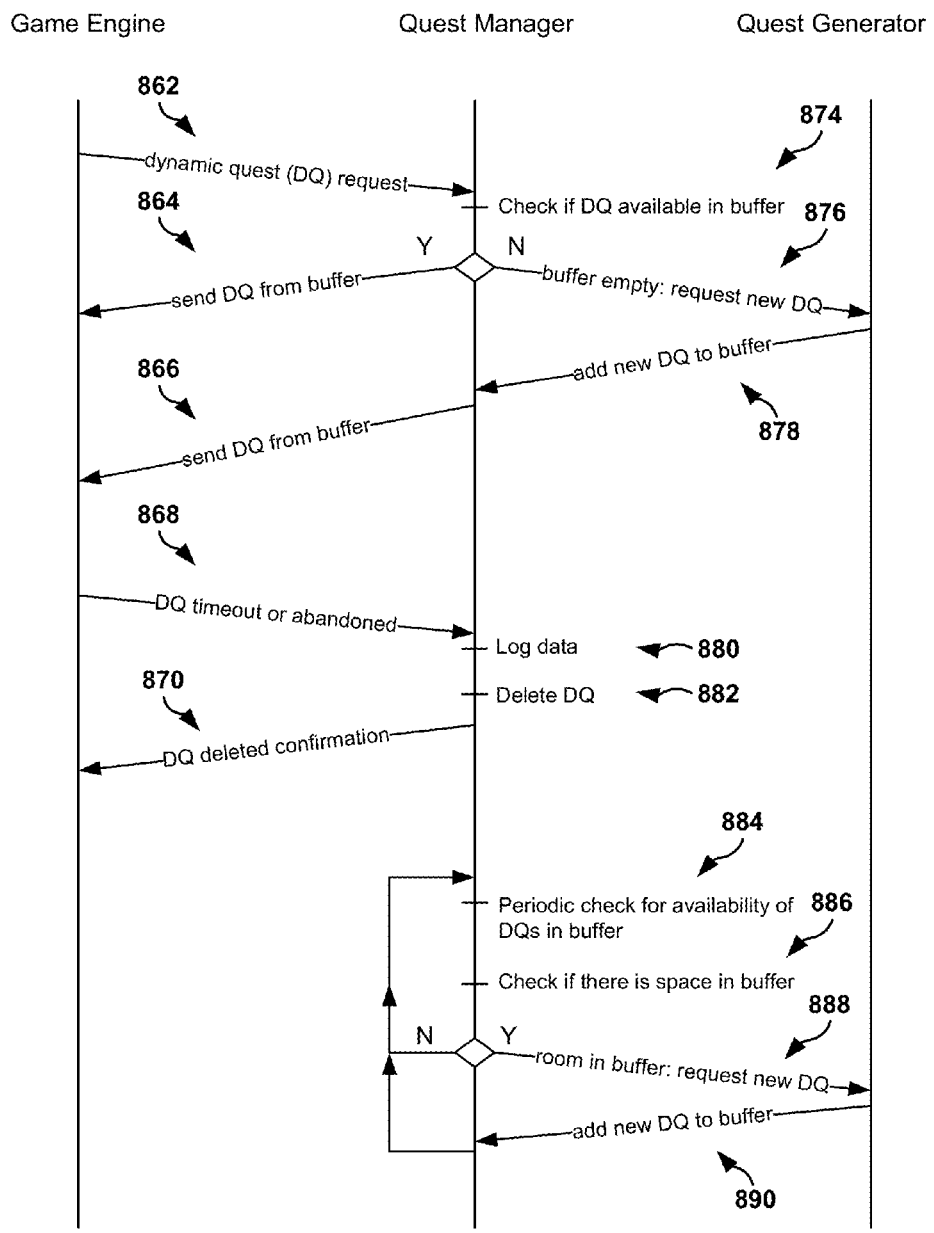
FIG. 8C illustrates some of the interactions between the game engine and the quest engine, according to one embodiment.

FIG. 8C illustrates some of the interactions between the game engine and the quest engine, according to one embodiment. As discussed above with reference to FIG. 6, the quest engine includes the quest manager and the quest generator. In operation 862, the game engine sends a request for a dynamic quest to the quest manager. In operation 874, the quest manager checks if a dynamic quest is available in the buffer of dynamic quests. If there is a dynamic quest available in the buffer, the quest manager takes a dynamic quest from the buffer and sends the dynamic quest 864 to the game engine, which makes the dynamic quest available to the player. If there is no dynamic quest available in the buffer, the quest manager sends a request 876 to the quest generator to create a new dynamic quest. After the quest generator creates a new quest, the quest generator sends the new dynamic quest to the buffer 878. In one embodiment, the quest generator sends the new quest to the quest manager, instead of saving the newly created dynamic quest in the buffer.

After the quest manager receives the new dynamic quest from the quest generator, the quest manager sends the dynamic quest to the game engine 866, which makes the new dynamic quest available to the player.

When a quest times out (e.g., the deadline to finish the quest has passed without the player completing the quest) or when a player abandons the quest, the game engine notifies 868 the quest manager that the quest has timeout or has been abandoned. The quest manager logs that the quest has timed out or has been abandoned 880 and proceeds to delete the dynamic quest from the database of pending dynamic quests 882. After the dynamic quest is being deleted, the quest manager sends a confirmation 870 to the game engine.

The quest manager checks periodically 884 the availability of dynamic quests in the buffer. For each player, the quest manager checks if there is additional space in the buffer for a new dynamic quest. For example, in one embodiment each user has room in the buffer for three dynamic quests. Therefore, if a user has less than three dynamic quests in the buffer, the quest manager requests a new dynamic quest 888 to the quest generator. In response, the quest generator adds the new dynamic quest to the buffer of the player 890.

Figure 8D:
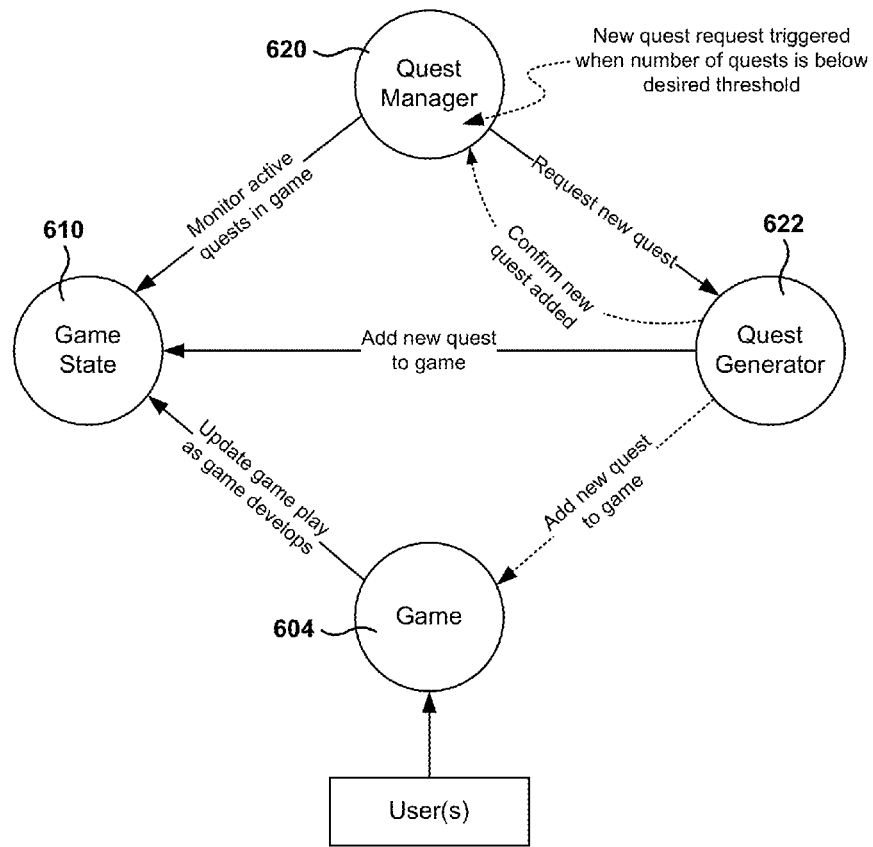
FIG. 8D illustrates the logic utilized for generating dynamic quests, in accordance with one embodiment.

FIG. 8D illustrates the logic utilized for generating dynamic quests, in accordance with one embodiment. In one embodiment, as users play the game 604, the game stage 610 is updated, which includes, among other things, updating the list of pending quests in the game. The quest manager 620 includes logic for the monitoring, creation, and deletion of dynamic quests. The quest manager 620 monitors the inventory of active quests in the games of players by checking the game state 610.

When the quest manager 620 detects that a new quest is required (e.g., because the number of quests is below a desired threshold, because a player needs a quest, because the buffer for the player has room for another quest, or because a shared pool of quests has room for new quests, etc.), the quest manager 620 sends a request for a new quest to quest generator 622. After the quest generator 622 creates the new quest, as described above, the quest is added to the game, which causes the game state 610 to be updated with the new quest. For example, the new quest is presented to the user, or is placed in storage waiting for the proper time to present the new quest to the user, such as when the user clicks in an object of the game (e.g., a letter, a non-player character, etc.) that causes the presentation of the quest to the player.

Figure 9A:
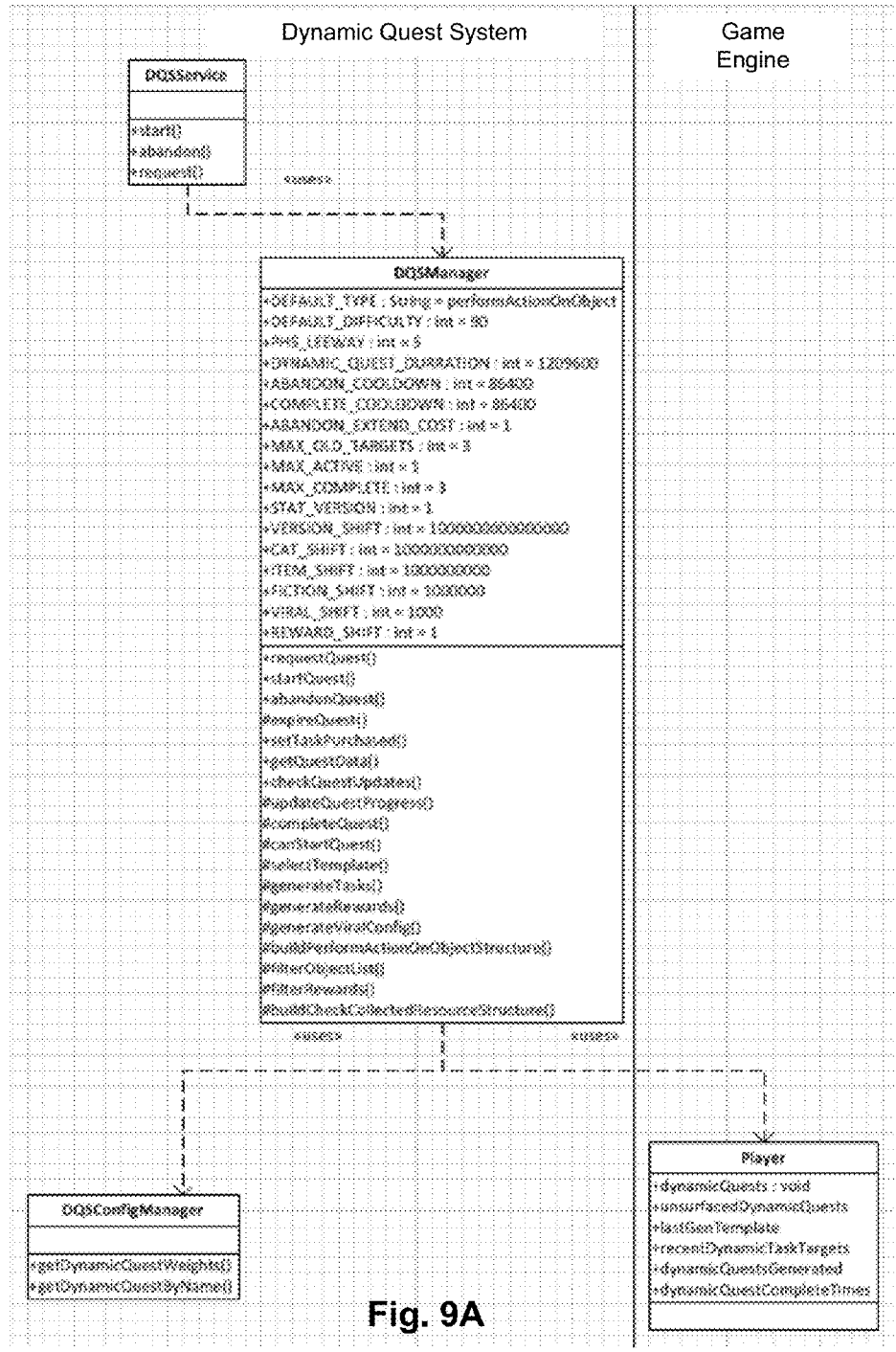
FIGS. 9A-9E illustrate exemplary data structures and interactions, according to one embodiment.
Figure 9B:
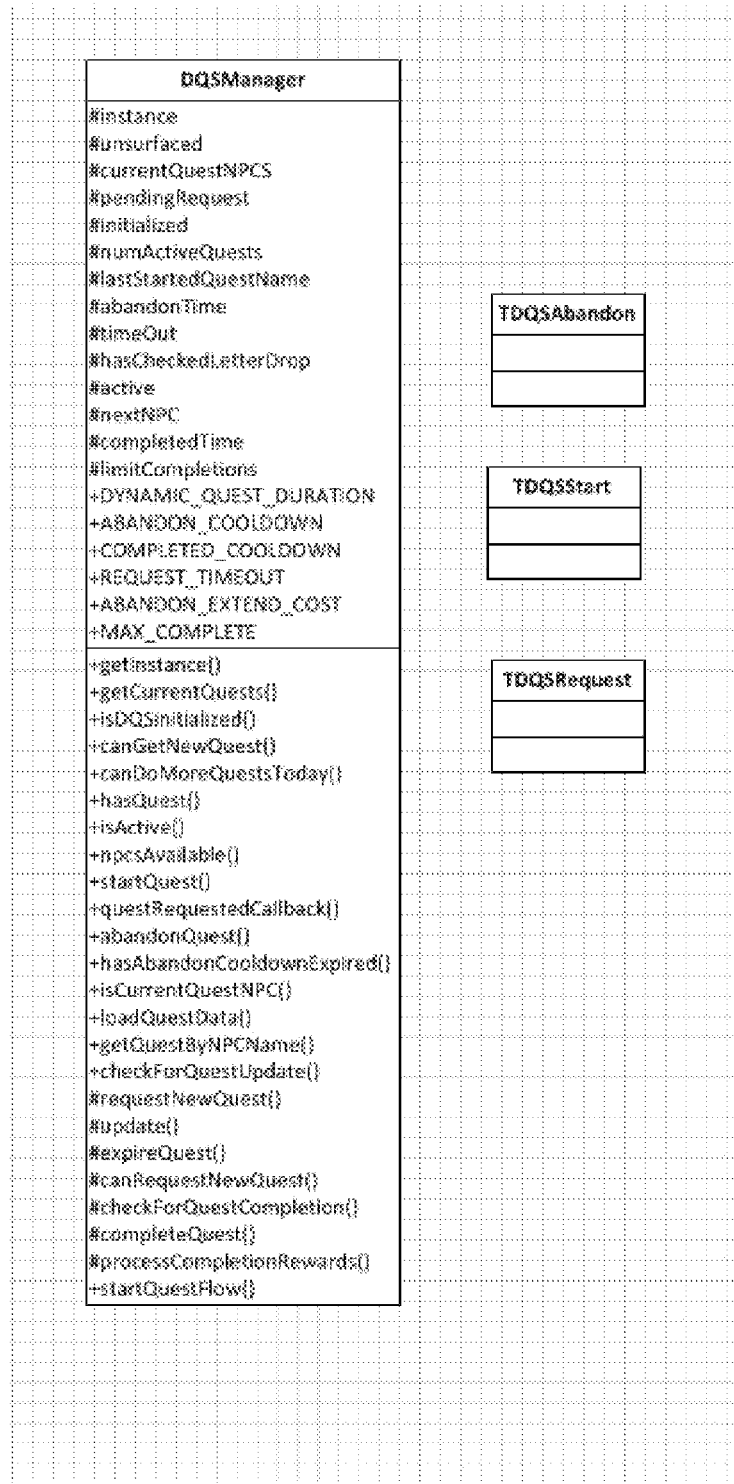

FIGS. 9A-9E illustrate exemplary data structures and interactions, according to one embodiment. FIG. 9A illustrates the use of data structures in the dynamic quest system and the game engine, according to one embodiment. FIG. 9B illustrates another embodiment of a data structure utilized by the quest manager to store quest data.

Figure 9C:
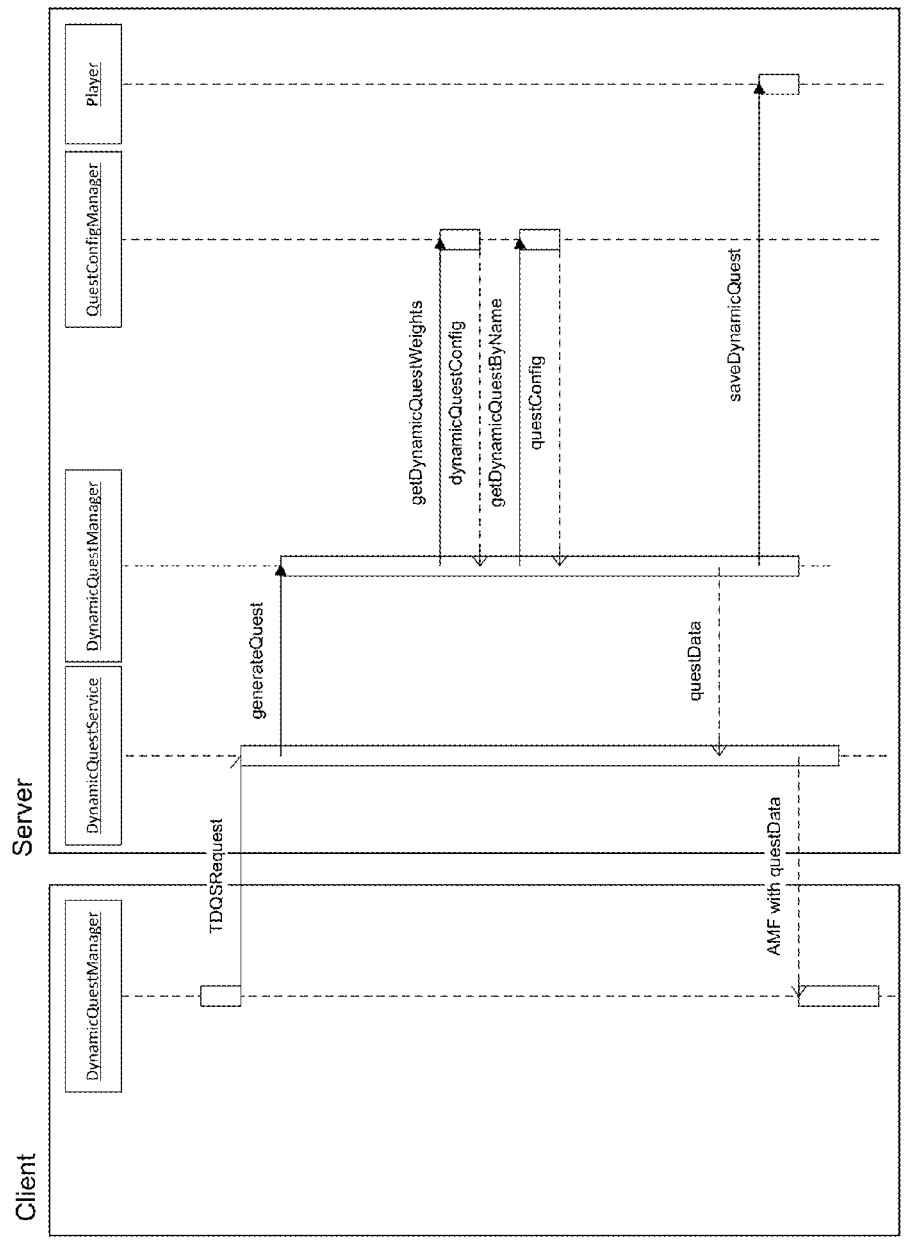
Figure 9D:
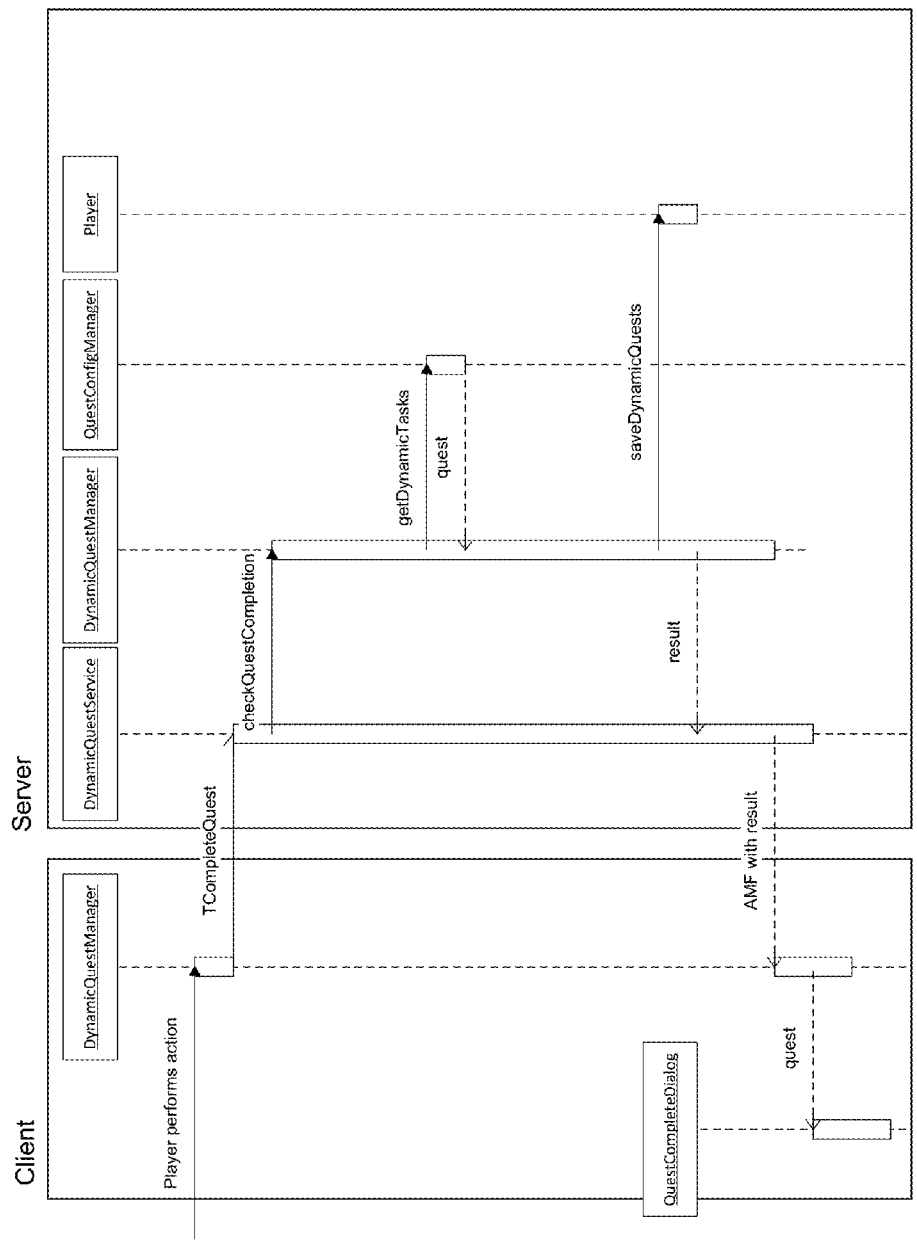
Figure 9E:
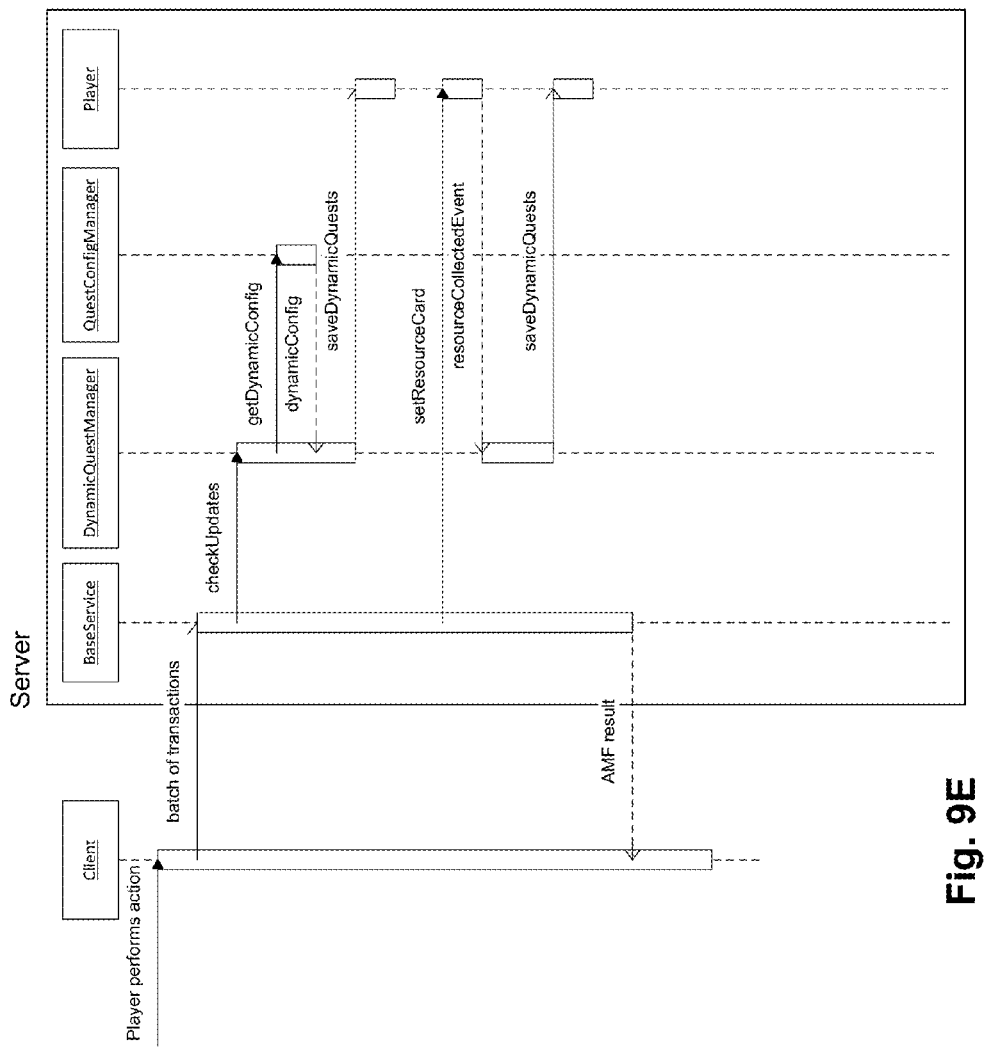

FIG. 9C illustrates the interface between the client and the server, according to one embodiment, when a dynamic quest request is originated at the client. FIG. 9D illustrates the interface between the client and the server, according to one embodiment, regarding the completion of a dynamic quest. FIG. 9E illustrates an embodiment of an interface between the client and the server for processing a batch of transactions originated at the client, where the transactions are related to dynamic quest operations.

It is noted that the embodiments illustrated in FIGS. 9A-9E are exemplary, and some operations may be omitted and some added, so long as the functionality of generating dynamic quests is provided. Other embodiments may utilize different interfaces, perform operations in a different order, or utilize different data structures. The embodiments illustrated in FIGS. 9A-9E should therefore not be interpreted to be exclusive or limiting, but rather exemplary or illustrative.

Figure 10A:
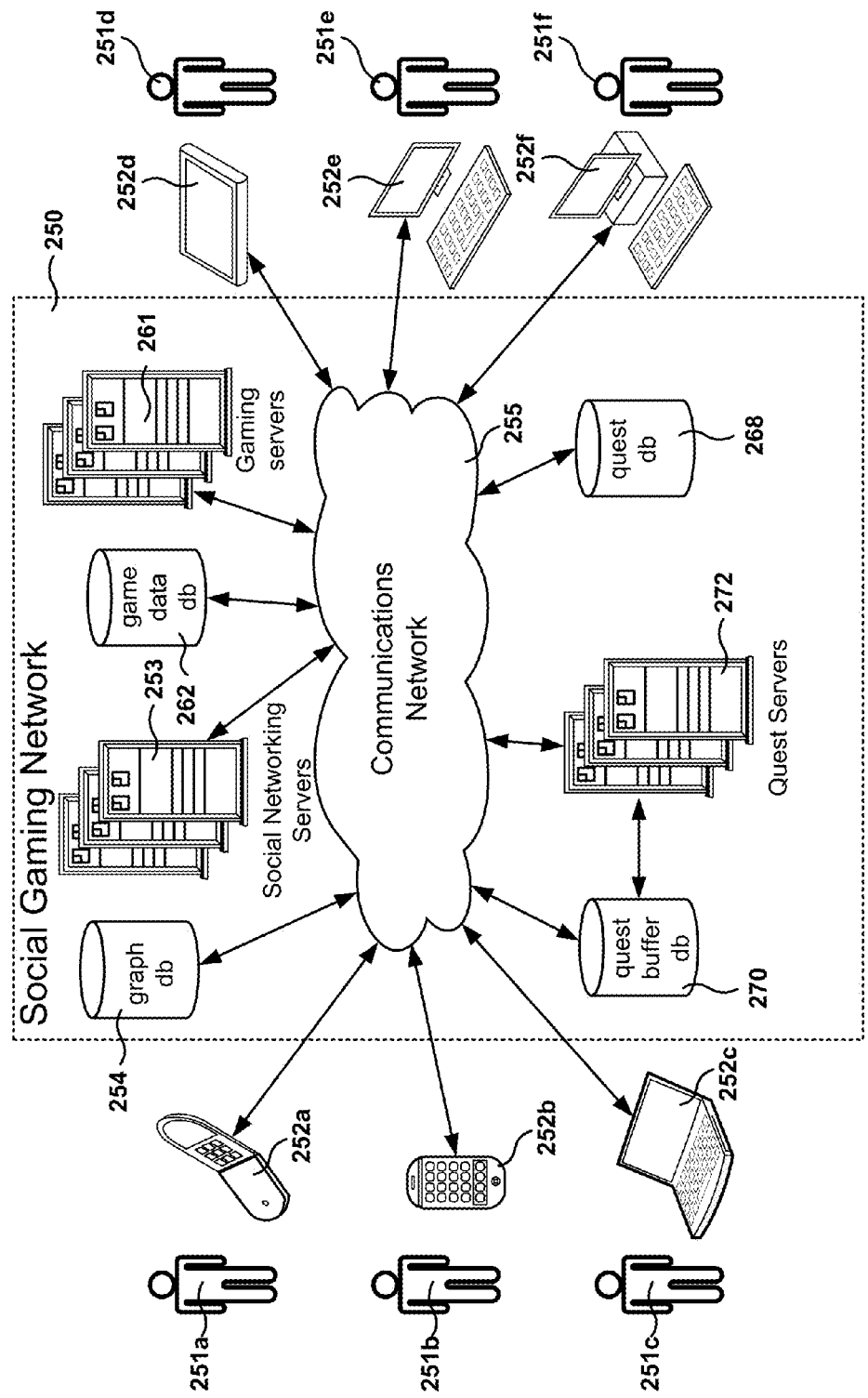
FIG. 10A shows a block diagram illustrating a social gaming network architecture, according to one embodiment.

FIG. 10A shows a block diagram illustrating a social gaming network architecture, according to one embodiment. In some implementations, a plurality of players (e.g., 251a-251f) may be utilizing a social gaming network 250. Each player interacts with the social gaming network via one or more client devices (e.g., client devices 252a-252f). The clients may communicate with each other and with other entities affiliated with the gaming platform via communications network 255. Further, the players may be utilizing a social networking service provided by a social networking server (e.g., social networking servers 253) to interact with each other.

When a player provides an input into the player's client device, the client device may in response send a message via the communications network to the social networking server. The social networking server may update the player profile, save the message to a database, send messages to other players, etc. The social gaming network may include a social graph database 254, which stores player relationships, social player profiles, player messages, and player social data.

The gaming servers 261 host one or more gaming applications, and perform the computations necessary to provide the gaming features to the players and clients. One or more gaming databases 262 store data related to the gaming services, such as the gaming applications and modules, virtual gaming environment data, player gaming session data, player scores, player virtual gaming profiles, game stage levels, etc. The gaming servers may utilize the data from the gaming databases to perform the computations related to providing gaming services for the players.

Quest Servers 272 manage the quest system in the game, including the creation, tracking, expiration, abandonment, and deletion of crafted quests and dynamic quests. A quest database 268 includes the crafted and dynamic quests in use in the social gaming network. In addition, a quest buffer database 270 holds a buffer of dynamically generated quests available in order to provide quick service to players that requests new quests.

Figure 10B:
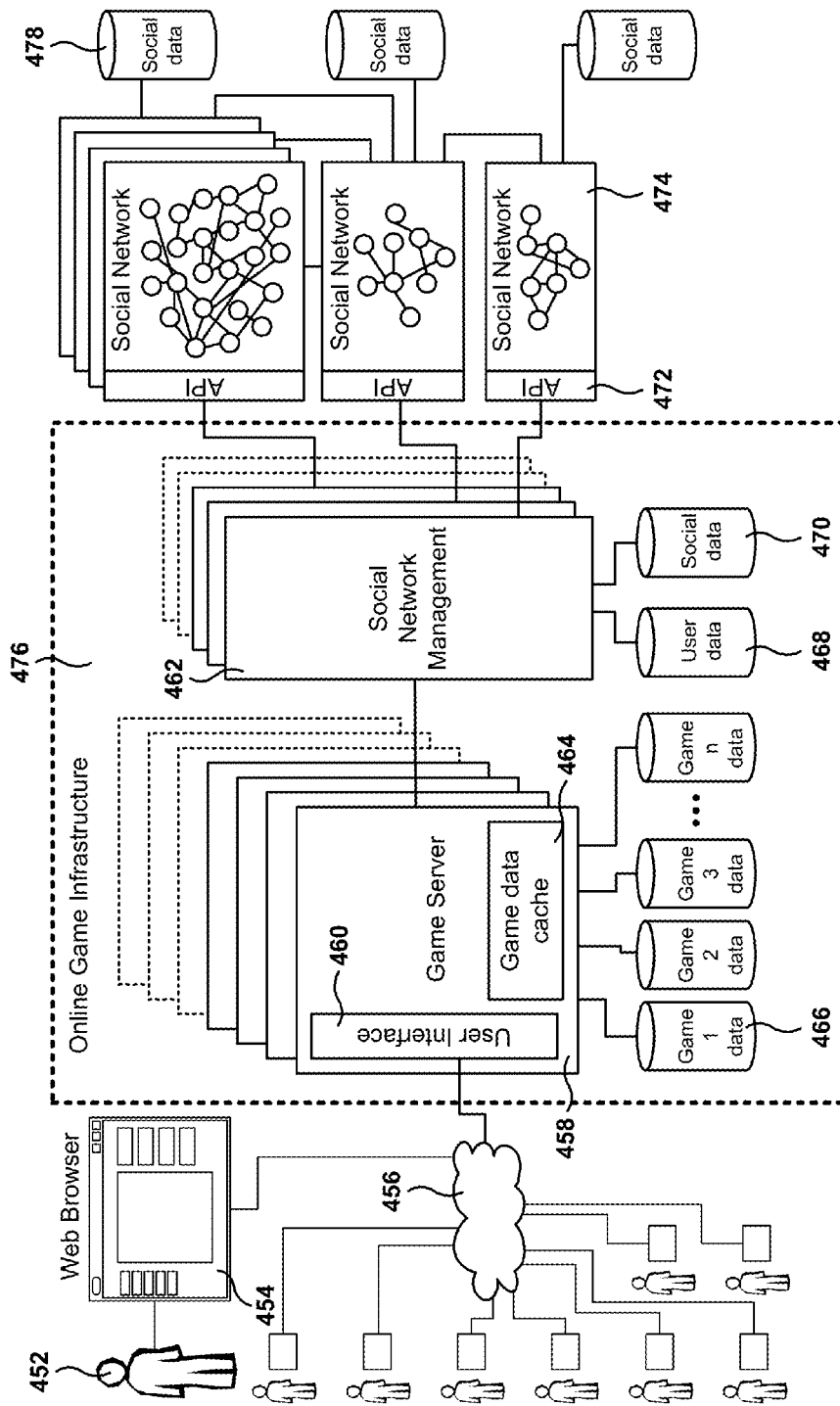
FIG. 10B illustrates an implementation of a Massively Multiplayer Online (MMO) infrastructure, according to one embodiment.

FIG. 10B illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. An example of a social network is Facebook, but it is possible to have other embodiments implemented in other social networks. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 10B is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10B should therefore not be interpreted to be exclusive or limiting, but rather exemplary or illustrative.

Figure 11:
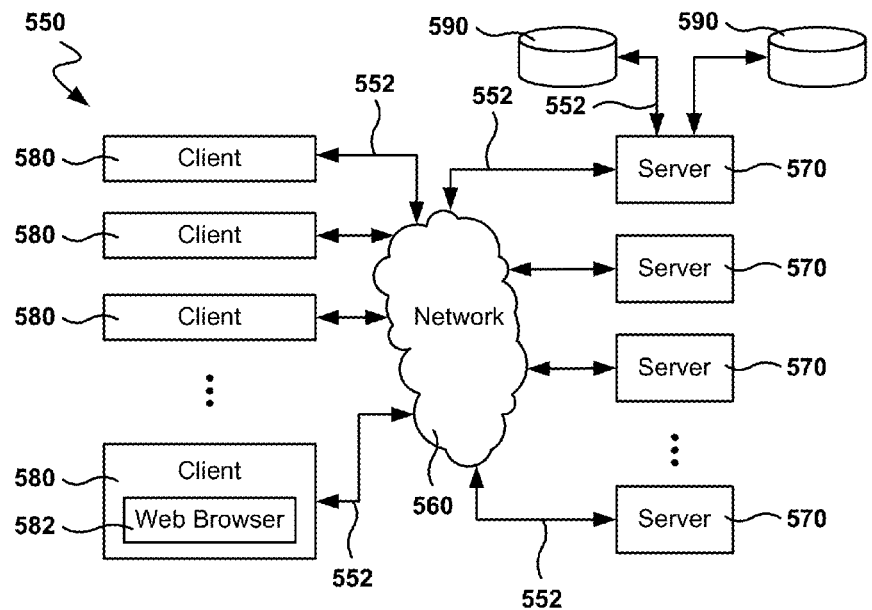
FIG. 11 illustrates an example network environment suitable for implementing embodiments.

FIG. 11 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, quest server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 12:
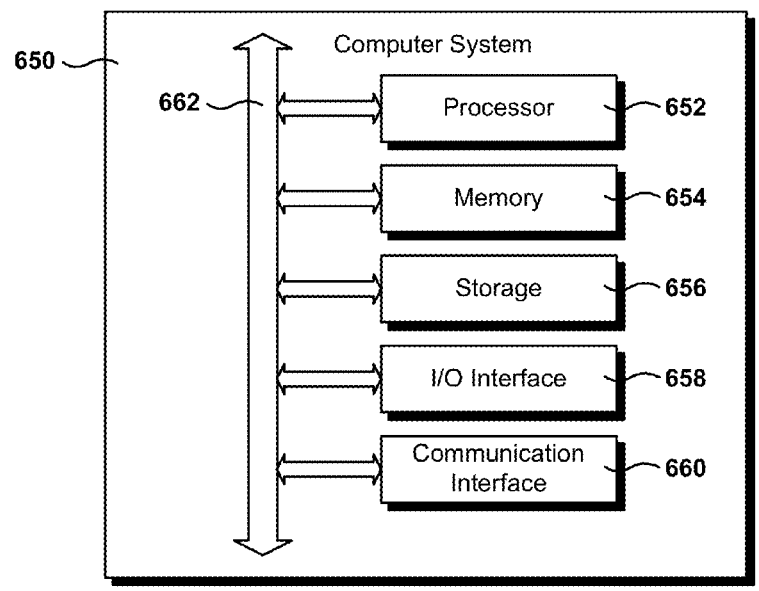
FIG. 12 illustrates an example computer system for implementing embodiments.

FIG. 12 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for executing an online game, the method comprising:
    determining, by a computer program, if a number of game quests assigned to a player in the online game is below a predetermined threshold;
    when the number of game quests is below the predetermined threshold, identifying a template from a plurality of templates for a dynamic quest to be created by the computer program, the template including a plurality of tasks and a plurality of rewards, wherein each task is predefined and specifies a respective assignment that a player must complete in the online game;
    selecting two or more tasks from the template for the dynamic quest, the two or more tasks defining a subset from the plurality of tasks, the selecting of two or more tasks being performed by the computer program automatically without requiring user input to select the two or more tasks;
    determining an amount of game currency required to buy completion of the selected two or more tasks;
    selecting, by the computer program, one or more rewards from the template for the dynamic quest based on the amount of game currency required;
    creating the dynamic quest in the online game with the selected two or more tasks and the selected one or more rewards; and
    providing the dynamic quest to the player in the online game after the creating, wherein the selected one or more rewards are provided to the player after the player completes all the selected two or more tasks in the dynamic quest, wherein operations of the method are executed by a processor.

2. The method as recited in claim 1, wherein identifying the template further includes:
    determining a previous template that was utilized for creating a most recently created dynamic quest for the player before identifying the template; and
    selecting a template different from the previous template to create the dynamic quest.

3. The method as recited in claim 1, wherein selecting two or more tasks further includes:
    selecting tasks that were not selected for a last dynamic quest created for the player.

4. The method as recited in claim 1, wherein selecting two or more tasks further includes:
    determining a number of repetitions for each of the selected two or more tasks, wherein the player must successfully complete each of the two or more tasks the corresponding number of repetitions before the dynamic quest is considered complete.

5. The method as recited in claim 1, wherein selecting one or more rewards further includes:
    determining a difficulty level for each of the selected two or more tasks based on the amount of game currency.

6. The method as recited in claim 1, wherein selecting two or more tasks further includes:
    selecting a first task that requires an action to be performed on a game object; and selecting a second task that requires sending a viral request to another player of the online game asking for an asset in the online game.

7. The method as recited in claim 1, wherein the template further includes a plurality of titles and a plurality of fiction messages, wherein any title and any fiction message maybe selected together with any task from the plurality of tasks and any reward from the plurality of rewards, wherein each task from the template further includes a task icon and one or more hints, wherein each reward from the template further includes a reward icon.

8. The method as recited in claim 7, further including:
selecting a title from the plurality of titles for the dynamic quest; and
selecting a fiction message from the plurality of fiction messages for the dynamic quest.

9. The method as recited in claim 1, wherein each template from the plurality of templates has an associated theme.

10. The method as recited in claim 1, further including:
creating a plurality of additional dynamic quests;
adding the created additional dynamic quests to a buffer of unassigned dynamic quests; and
assigning the unassigned dynamic quests from the buffer to players in the online game.

11. The method as recited in claim 1, wherein identifying the template further includes:
selecting the template from a template database holding the plurality of templates for generating dynamic quests.

12. The method as recited in claim 1, wherein selecting the two or more tasks further includes:
utilizing game history, user profile information, and user social data for selecting the two or more tasks.

13. The method as recited in claim 1, wherein by utilizing a plurality of templates is used by the online game to generate thousands of different quests.

14. The method as recited in claim 1, wherein the template includes a plurality of titles, a plurality of fictions, a plurality of tasks, and a plurality of rewards.

15. A computer program embedded in a non-transitory computer-readable storage medium, when executed by one or more processors, for executing an online game, the computer program comprising:
program instructions for determining, by a computer program, if a number of game quests assigned to a player in the online game is below a predetermined threshold;
program instructions for identifying, when the number of game quests is below the predetermined threshold, a template from a plurality of templates for a dynamic quest to be created by the computer program, the template including a plurality of tasks and a plurality of rewards, wherein each task is predefined and specifies a respective assignment that a player must complete in the online game;
program instructions for selecting two or more tasks from the template for the dynamic quest, the two or more tasks defining a subset from the plurality of tasks, the selecting of two or more tasks being performed by the computer program automatically without requiring user input to select the two or more tasks;
program instructions for determining an amount of game currency required to buy completion of the selected two or more tasks;
program instructions for selecting, by the computer program, one or more rewards from the template for the dynamic quest based on the amount of game currency required;
program instructions for creating the dynamic quest in the online game with the selected two or more tasks and the selected one or more rewards; and
program instructions for providing the dynamic quest to the player in the online game after the creating, wherein the selected one or more rewards are provided to the player after the player completes all the selected two or more tasks in the dynamic quest.

16. The computer program as recited in claim 15, further including:
program instructions for determining, before identifying the template, if a number of game quests assigned to the player in the online game is below a predetermined threshold; and
program instructions for creating the dynamic quest for the player when the number of game quests is below the predetermined threshold.

17. The computer program as recited in claim 15 further including:
program instructions for enabling the player to abandon the dynamic quest.

18. The computer program as recited in claim 15, further including:
program instructions for creating a plurality of additional dynamic quests using any template from the plurality of templates;
program instructions for adding the created additional dynamic quests to a buffer of unassigned dynamic quests; and
program instructions for assigning the unassigned dynamic quests from the buffer to players in the online game.

19. The computer program as recited in claim 15, wherein identifying the template further includes:
program instructions for selecting the template from a template database holding the plurality of templates for generating dynamic quests.

* * * * *